April 8, 1952  F. SLUSHER  2,592,074
WEIGHING AND PACKAGING APPARATUS
Filed Aug. 29, 1946  2 SHEETS—SHEET 1
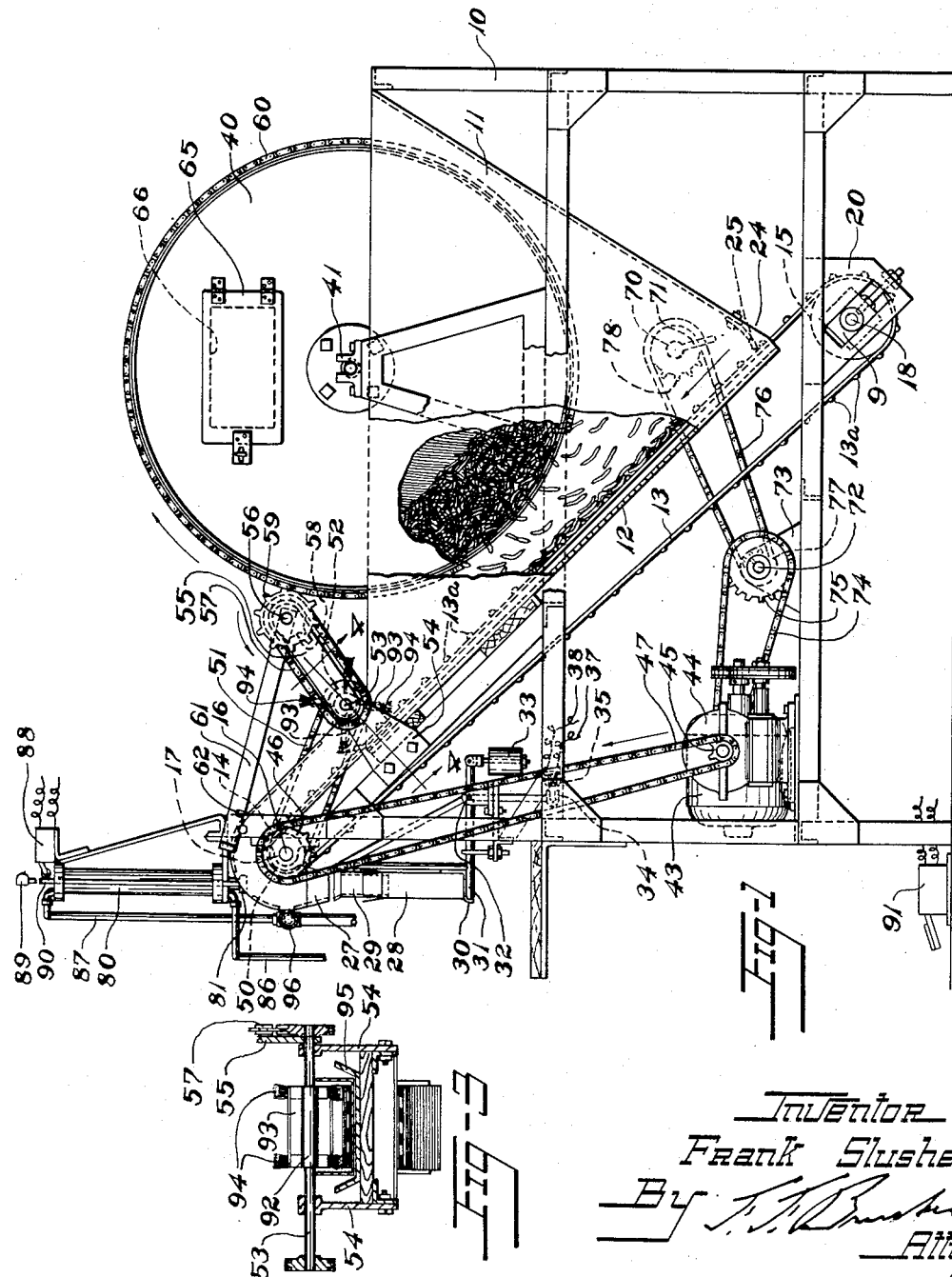
Inventor
Frank Slusher
By
Atty

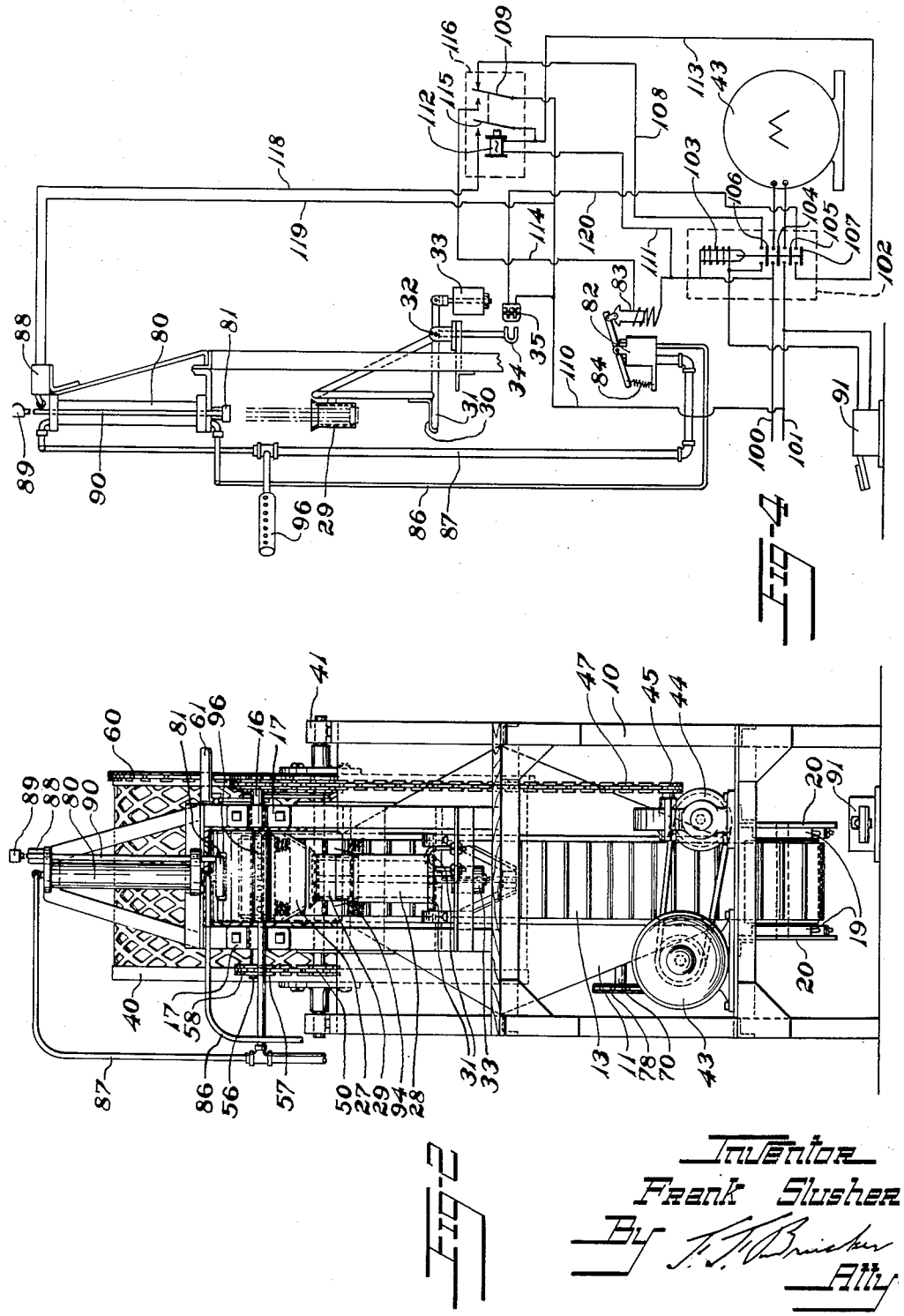

Patented Apr. 8, 1952

2,592,074

UNITED STATES PATENT OFFICE 2,592,074

WEIGHING AND PACKAGING APPARATUS

Frank Slusher, Akron, Ohio, assignor to The B. F. Goodrich Company, New York, N. Y., a corporation of New York Application August 29, 1946, Serial No. 693,719

4 Claims. (Cl. 249—4)

This invention relates to apparatus for weighing and packaging and is especially useful in the packaging of rubber bands.

The principal objects of the invention are to weigh the articles accurately and to compact the articles in a container.

Other objects are to provide for progressive feed of material to a container and control of the feed by weight of the container, to provide for compacting of the material in the container at the end of the filling operation, to provide against operation of the control mechanism before the feeding mechanism is started, to accomplish weighing and packaging with a minimum of handling, and to provide simplicity of construction and facility of operation.

These and other objects will appear from the following description and the accompanying drawings.

Of the drawings,

Fig. 1 is a side elevation of apparatus constructed in accordance with and embodying the invention, parts being broken away, Fig. 2 is a front elevation thereof, Fig. 3 is a sectional detail view taken on line 3—3 of Fig. 1.

Fig. 4 is a wiring and piping diagram of the apparatus.

Referring to the drawings, the numeral 10 designates the frame of the apparatus which supports a hopper 11 having an inclined bottom wall 12. A conveyor belt 13 is trained about an upper pulley 14 and a lower pulley 15 with its upper reach extending along the wall 12 of the hopper. The belt has flight-bars 13a fixed thereto and travels in a direction to feed the material, such as rubber bands upwardly along the bottom wall 12. The upper pulley 14 is fixed to a shaft 16 journaled on the frame 10 in bearings 17. The lower pulley is fixed to a shaft 18 journaled in boxes 19 slideably mounted for adjustment of tension of the belt in brackets 20 fixed to the frame. An opening 24 is formed at the bottom of the hopper to clear the belt, and a flexible flap 25 of rubber and fabric material is fixed to the hopper in position to normally close the opening and to be deflected by passage of the flight bars.

A delivery boot 27 is fixed to the frame 10 about the upper roll 14 in position to receive material passing over the upper roll 14 and deliver it to a container 28 through a funnel 29 supported by the beam 31.

The invention contemplates control of the filling of containers by the weight thereof. To this end the container 28 rests on the pan 30 of a scale beam 31 pivoted to the frame at 32. A counterweight 33 is suspended from the opposite end of the beam and normally holds the pan in its uppermost position. The beam also supports a permanent magnet 34 in a position close to a mercury switch 35. The mercury switch has an armature adapted to be attracted by the magnet. The switch is of the single-pole single-throw type and is supplied by electric current through lines 37, 38. The magnet operates the switch when the magnet is moved toward the switch by movement of the beam under the weight of a filled package to initiate certain operations as hereinafter described.

For supplying the hopper 11 with material at such speed that the material is not compacted on the conveyor belt but is delivered to it at substantially the speed of withdrawal by the belt, a supply drum 40 is rotatably supported on bearings 41 fixed to the frame 10. The peripheral walls of the drum are of apertured material such as woven wire or perforated metal. The size of the openings is dependent upon the size of the article to be packaged. In the case of narrow rubber bands two inches in length, the openings should be about one inch square. For shorter rubber bands the openings should be correspondingly smaller.

If the hopper 11 were filled with rubber bands, the bands would be compacted and would bridge over the conveyor belt. The object of the drum is to feed the bands gradually to the belt so that such bridging and compacting is avoided.

For rotating the drum and moving the conveyor belt, a motor 43 is fixed to frame 10 and drives a speed reducer 44 which has a sprocket 45 which in turn drives a sprocket 46 fixed to shaft 16 through a chain 47. Another sprocket 50, fixed to shaft 16 drives a chain 51 which engages a sprocket 52 fixed to a shaft 53. Shaft 53 is rotatably mounted in brackets 54, 54, mounted on hopper 11. A swing frame 55 is journaled on shaft 53 and a shaft 56 is journaled in bearings at its outer end. A sprocket 55 is fixed to shaft 56 and is drawn from shaft 53 by a chain 57 and a sprocket 58 fixed thereto. Another sprocket 59 fixed to shaft 56 engages a sprocket chain 60 which encompasses the drum 40 and is welded thereto. Swing frame 55 is connected to frame 10 by a link 61. These have notches 62 for engaging pins on the boot at positions where the sprocket 59 is in or out of mesh with chain 60.

The drum 40 has a door 65 over an opening 66 therein, and in the position of the sprocket 59 where the sprocket is out of mesh with the chain 60, the drum may be rotated by hand and the drum loaded with material through the door opening.

To further prevent accumulation of the band material in the bottom of the hopper 11 a shaft 70 is rotatably mounted in bearings carried by the hopper. A paddle 71 is fixed to the shaft within the hopper. A jack-shaft 72 is rotatably mounted in bearings 73, 73 fixed to frame 10. Shaft 72 is driven from the speed reducer 44 by a chain 74 and sprocket 75. Shaft 70 is driven from shaft 72 by a sprocket chain 76 engaging sprockets 77, 78 on the shaft respectively.

For compacting the bands or other material in the package, a double-acting pressure-fluid-operated cylinder 80 is fixed to the frame 10. A plunger 81 is fixed to its piston rod in position to move vertically through the funnel 29. The cylinder is operated by a four-way solenoid operated valve 82 having an operating solenoid 83 for moving its piston to the lowered position, and a coil spring 84 for normally holding the valve in a position to move the piston to the upper position. Pipes 86, 87 connect the valve to opposite ends of the cylinder and act alternately as supply and exhaust pipes. A limit switch 88 is mounted on the cylinder in position to be engaged by a stop 89 mounted on a rod 90 fixed to the plunger 81. At the lowered position of the plunger, the normally closed limit switch is engaged by the stop and opened to deenergize the solenoid of the valve 82 and cause upward return of the plunger.

A normally open foot operated switch 91 is provided for starting operation of the machine.

For trimming the load on the conveyor a rotatable drum 92 is fixed to shaft 53 and has flexible paddles 93 of rubber and fabric construction fixed thereto. The paddles just clear the flight bars 13a. To clear edges of the conveyor belt and thereby prevent articles from becoming wedged between the belt and its guide trough, brushes 94 are fixed to ends of the paddles 93 and sweep the margins of the belt where they come close to the guide trough 95.

For preventing further immediate feed of material from the conveyor belt upon the package being filled in case the conveyor does not stop instantly and to remove any bands protruding from the conveyor in the path of the plunger, a jet pipe 96 is located in the boot 27 and has jets directed at the roller 14. It is connected to a high pressure air supply such as the pipe 87 so that simultaneous with lowering of plunger 81 air under high pressure is blown against the conveyor belt at roll 14 blowing back oncoming material and effecting a retreat of material at the delivery end of the conveyor until the plunger returns.

The electrical control system is as follows: Power is supplied from lines 100, 101 and starting of motor 44 is controlled by foot switch 91 through a solenoid-operated switch 102. The solenoid 103 is initially energized by closing of the switch 91 which connects the solenoid across lines 100, 101. This causes contacts 104, 105 to close and connect lines 100, 101 to motor 44, starting the conveyor. At the same time contacts 106 and 107 are closed. Contact 106 is in a holding circuit around the foot switch 91 and keeps solenoid 103 engaged after the operator's foot is removed from switch 91. This holding circuit is from line 100 by way of solenoid 103, contact 106, line 108, normally closed contact 109, and line 110 to line 101.

Contact 107, in closing, makes possible the operation of mercury switch 35 after the foot switch 91 has been depressed. It is for the purpose of preventing premature operations due to closing of mercury switch 35 by the placing of a container on the scale pan 30 before the motor 44 is running.

With the motor 44 running, loading of the container with material to the desired weight tips scale pan 30, moving the fixed magnet 34 to a position where it attracts the armature of the mercury switch 35, closing the switch. This completes a circuit from line 100 by way of line 111 solenoid 112, line 113, contact 107, line 120 mercury switch 35, and line 110 to line 101, energizing solenoid switch 116. With the energizing of solenoid 112 contactor 109 opens the holding circuit through line 108, stopping motor 43 and closes a circuit which energizes the solenoid valve 82 through line 114. Simultaneously a contact 115 of solenoid valve 116 closes a connection from lines 100 and 111 through solenoid 112 and contact 115 and by way of line 118, normally closed limit 88, line 119 and line 110 to line 101.

Solenoid valve 82 is reversed by the energizing of its solenoid so as to supply compressed air to pipe 87 and to connect pipe 86 to exhaust. This causes ram 81 to descend and at the same time forces compressed air from jet pipe 96 against the conveyor. At the bottom of its stroke, the cam 89 contacts normally closed limit switch 88 and opens the circuit therethrough deenergizing solenoid valve 82 and solenoid 112. The spring 84 then reverses valve 82 returning the ram 81 to its uppermost position.

The operation of the apparatus is as follows: An empty container is placed on the scale pan 30 over the mouth of funnel 29 and a supply of rubber bands or other material to be packaged is placed in the drum 40. The foot-switch 91 is then depressed starting the motor 44 and with it the conveyor belt 13 and the drum 40.

As the bands or other articles are sifted by the drum onto the belt, they are carried upwardly and deposited through the funnel 29 through the container 28. When the container is loaded to the desired weight the conveyor and drum are automatically stopped and bands protruding beyond the conveyor are blown back onto the conveyor and the ram 81 descends, pushing the articles through the funnel and packing the articles in the container. The plunger then rises and the container is removed.

Variations may be made without departing from the scope of the invention as it is defined by the following claims.

I claim:

1. Apparatus for weighing and packaging resilient elastic rubber bands, said apparatus comprising a rotatable drum having an apertured peripheral surface for depositing the bands, a hopper enclosing the lower part of said drum, a conveyor belt having an inclined reach arranged along an inclined wall of the hopper to receive and elevate the bands, a rotatable paddle wheel located above the conveyor belt at said reach for trimming the load of bands on said belt, a funnel for receiving bands from the upper end of said reach, a jet at said funnel opposed to the travel of bands at the upper end of said reach, a high pressure air supply connected to said jet, a scale beam having a pan below said funnel for supporting a container to be filled, a valve controlling said jet, means for driving said drum, said belt and said paddle wheel, a switch controlled by movement of said scale beam under load of a filled container for stopping said driving means and said paddle wheel, a tamper in alignment with said funnel and operating therethrough to tamp the filled container, and means operated by said switch for supplying air to said jet to bias the advance of bands by said conveyor belt and to effect a retreat of bands at the delivery end of said conveyor belt and operating said tamper simultaneously with stopping of said driving means.

2. Apparatus for weighing and packaging resilient rubber bands, said apparatus comprising a scale beam adapted to support a container to be filled, a funnel above said beam for guiding bands to said container, an upwardly inclined conveyor belt for elevating bands and delivering them to said funnel, an air jet mounted at the delivery end of the belt and directed toward said belt to oppose delivery of bands to said funnel, a high pressure air supply connected to said jet and means operable in response to lowering of said scale beam under the load of a filled container for effecting an arrest of advance of said belt and simultaneous direction of a blast of air against advance of the bands to effect a retreat of bands at the delivery end of said conveyor belt.

3. Apparatus for weighing and packaging resilient rubber bands, said apparatus comprising a scale beam adapted to support a container to be filled, a funnel above said beam for guiding bands to said container, an upwardly inclined conveyor belt for elevating bands and delivering them to said funnel, means for loading said belt with bands, an air jet mounted at the delivery end of the belt and directed toward said belt to oppose delivery of bands to said funnel, a high pressure air supply connected to said jet, and means operable in response to lowering of said scale beam under the load of a filled container for effecting an arrest of advance of said belt and simultaneous direction of a blast of air against advance of said bands to effect a retreat of bands at the delivery end of the conveyor.

4. Apparatus for weighing and packaging resilient rubber bands, said apparatus comprising a scale beam adapted to support a container to be filled, a funnel above said beam for guiding bands to said container, an upwardly inclined guideway terminating at said funnel, a conveyor belt supported by said guideway for elevating bands and delivering them to said funnel, a rotatable trimming wheel having pliable blades spaced above said conveyor belt and flanking brush members contacting said guideway to clear the margins of the belt, an air jet mounted at the delivery end of said belt and directed toward said belt to oppose delivery of bands to said funnel, a high pressure air supply connected to said jet, and means operable in response to lowering of said scale beam under the load of a filled container for effecting an arrest of advance of said belt and simultaneous direction of a blast of air against advance of said bands to effect a retreat of bands at the delivery end of the conveyor.

FRANK SLUSHER.

REFERENCES CITED

The following references are of record in the file of this patent:

UNITED STATES PATENTS

| Number | Name | Date |
|---|---|---|
| 417,609 | Tuck | Dec. 17, 1889 |
| 1,044,965 | Zollner | Nov. 19, 1912 |
| 1,260,556 | Layman | Mar. 26, 1918 |
| 1,422,002 | Shaw | July 4, 1922 |
| 1,669,087 | Hungerford | May 8, 1928 |
| 1,798,776 | Allen | Mar. 31, 1931 |
| 1,979,492 | Russell | Nov. 6, 1934 |
| 2,060,011 | Andreas | Nov. 10, 1936 |
| 2,170,249 | Misner | Aug. 22, 1939 |
| 2,181,756 | Cook | Nov. 28, 1939 |
| 2,207,885 | Howard | July 16, 1940 |
| 2,303,140 | Sackett | Nov. 24, 1942 |
| 2,333,435 | Muskat | Nov. 2, 1943 |
| 2,352,114 | Muskat | June 20, 1944 |
| 2,357,475 | Kane | Sept. 4, 1944 |
| 2,380,733 | Durning | July 31, 1945 |

FOREIGN PATENTS

| Number | Country | Date |
|---|---|---|
| 713,921 | Germany | 1941 |